(12) United States Patent
Liscouet et al.

(10) Patent No.: US 11,338,908 B2
(45) Date of Patent: May 24, 2022

(54) METHOD AND SYSTEM FOR DEPLOYING A FLIGHT CONTROL SURFACE

(71) Applicant: BOMBARDIER INC., Dorval (CA)

(72) Inventors: Jonathan Liscouet, Montréal (CA); Zishaan Moledina, Laval (CA)

(73) Assignee: BOMBARDIER INC., Dorval (CA)

( * ) Notice: Subject to any disclaimer, the term of this patent is extended or adjusted under 35 U.S.C. 154(b) by 230 days.

(21) Appl. No.: 16/668,848

(22) Filed: Oct. 30, 2019

(65) Prior Publication Data

US 2020/0140064 A1    May 7, 2020

Related U.S. Application Data

(60) Provisional application No. 62/756,607, filed on Nov. 7, 2018.

(51) Int. Cl.
*B64C 13/40* (2006.01)
*B64C 13/50* (2006.01)
*F15B 11/22* (2006.01)

(52) U.S. Cl.
CPC .............. *B64C 13/40* (2013.01); *B64C 13/50* (2013.01); *F15B 11/22* (2013.01); *F15B 2211/782* (2013.01)

(58) Field of Classification Search
CPC ......... B64C 13/40; B64C 13/42; B64C 13/50; F15B 11/22; F15B 2211/782
See application file for complete search history.

(56) References Cited

U.S. PATENT DOCUMENTS

| 8,996,205 | B2 | 3/2015 | Pierre et al. |
| 9,376,204 | B2 | 6/2016 | Winkelmann |
| 9,899,940 | B2 | 2/2018 | Fattal |
| 2018/0362149 | A1* | 12/2018 | Huynh ................. B64C 13/503 |

* cited by examiner

*Primary Examiner* — Abiy Teka
(74) *Attorney, Agent, or Firm* — Norton Rose Fulbright Canada LLP

(57) ABSTRACT

A system and method for deploying a flight control surface. The method includes displacing actuators engaged with the flight control surface during an initial period wherein each actuator displaces from zero speed to a deployment speed, and during a deployment period after the initial period. The method includes during the deployment period, controlling displacement of at least one of the actuators in response to actuator status information received therefrom. The method includes during the initial period, limiting an acceleration of said actuator from the zero speed to the deployment speed. The system has a control unit with a force fight controller and an acceleration limiter.

13 Claims, 4 Drawing Sheets

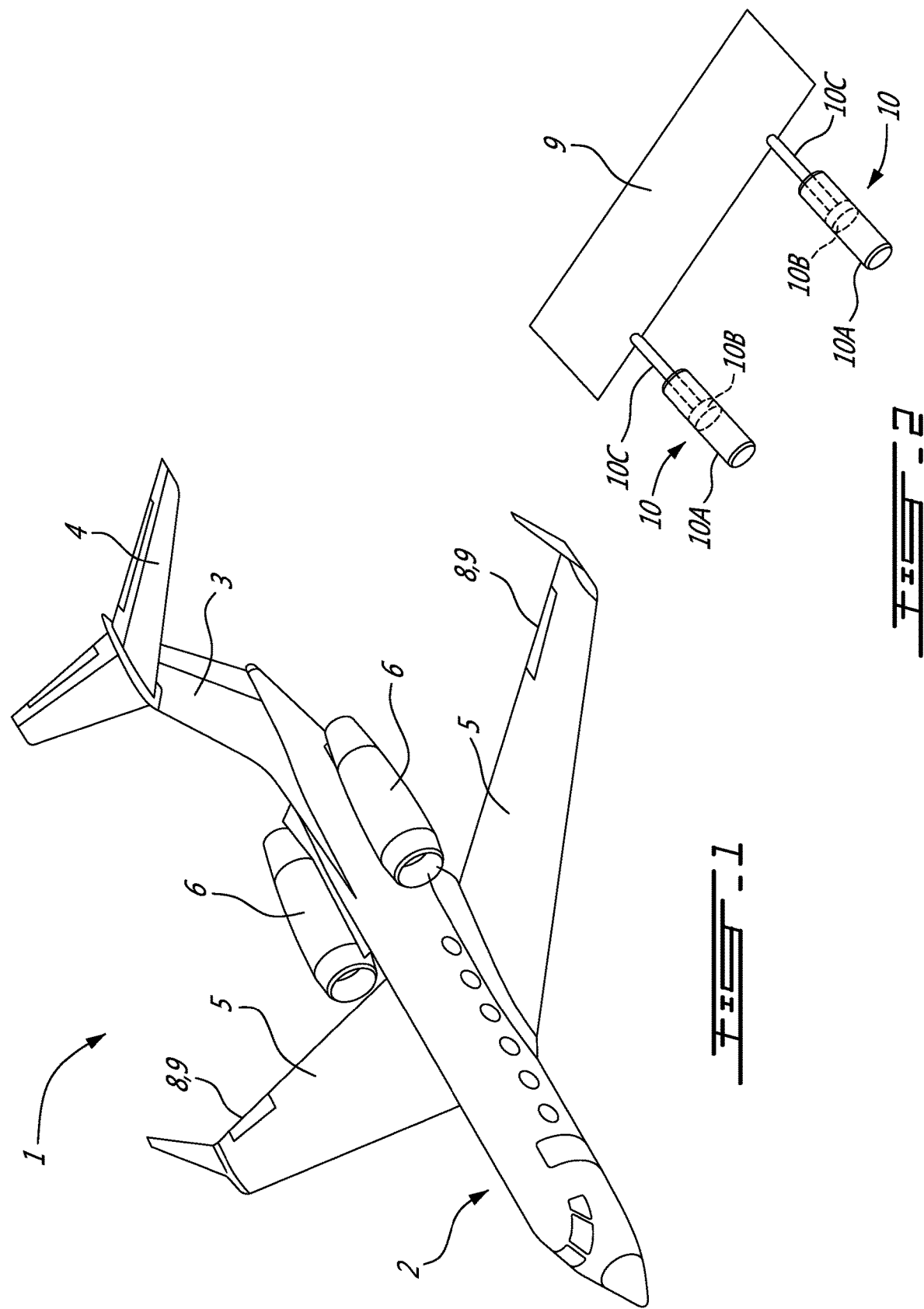

METHOD AND SYSTEM FOR DEPLOYING A FLIGHT CONTROL SURFACE

CROSS-REFERENCE TO RELATED APPLICATIONS

This application claims priority to U.S. provisional patent application 62/756,607 filed on Nov. 7, 2018, the entire contents of which are incorporated by reference herein.

TECHNICAL FIELD

The application relates generally to aircraft with flight control surfaces and, more particularly, to a method and system for deploying flight control surfaces.

BACKGROUND

Some flight control surfaces, such as ailerons, elevators, and rudders, are deployed by multiple actuators engaged to the same flight control surface. A difference between the movement of each actuator can create a load on the flight control surface known as force fight, which can cause fatigue. Flight control surfaces and actuators need to be designed to account for this fatigue, often making them bigger and heavier.

SUMMARY

In one aspect, there is provided a method for deploying a flight control surface, comprising: displacing actuators engaged with the flight control surface during an initial period wherein each actuator displaces from zero speed to a deployment speed, and during a deployment period after the initial period; during the deployment period, controlling displacement of at least one of the actuators in response to actuator status information received therefrom; and during the initial period, limiting an acceleration of said actuator from the zero speed to the deployment speed.

In an embodiment, limiting the acceleration includes limiting the acceleration of said actuator more than limiting the acceleration of at least another one of the actuators.

In an embodiment, the method further comprises providing a value for a deployed position of the flight control surface, and subsequently reducing the value of the deployed position of the flight control surface.

In an embodiment, reducing the value of the deployed position includes reducing the value of the deployed position before limiting the acceleration of said actuator.

In an embodiment, the method further comprises providing a target deployment speed for the actuators, and subsequently reducing the target deployment speed to the deployment speed.

In an embodiment, reducing the target deployment speed includes reducing the target deployment speed before limiting the acceleration of said actuator.

In an embodiment, the method further comprises receiving the actuator status information from at least one of the actuators, and outputting an actuator displacement command to said actuator to adjust a position of said actuator.

In another aspect, there is provided a system for deploying a flight control surface, comprising: actuators engaged with the flight control surface, each actuator being displaceable to displace the flight control surface during an initial period wherein each actuator displaces from zero speed to a deployment speed, and during a deployment period after the initial period; and at least one control unit operable to receive a control surface position command and to output an actuator displacement command, the at least one control unit comprising: a force fight controller in communication with each actuator to receive therefrom actuator status information, and in response thereto, to modify the actuator displacement command to control displacement of said actuator during the deployment period; and an acceleration limiter in communication with at least one of the actuators and operable during displacement of the actuators in the initial period to receive the control surface position command, and to output an acceleration limiter command to said actuator to limit an acceleration of said actuator from the zero speed to the deployment speed.

In an embodiment, the control surface position command includes a deployed position of the flight control surface, the acceleration limiter operable to receive the control surface position command and to output the acceleration limiter command to increase a time for achieving the deployed position of the flight control surface.

In an embodiment, the acceleration limiter command to said actuator is different from the acceleration limiter command outputted to at least another one of the actuators.

In an embodiment, the at least one control unit has a range limiter in communication with at least one of the actuators, the range limiter operable to receive the control surface position command including a deployed position of the flight control surface, the range limiter operable to output a range limited command to said actuator to decrease the deployed position of the flight control surface to a maximum value of the deployed position of the flight control surface.

In an embodiment, the range limiter is operable to receive the control surface position command before the acceleration limiter, and to output the range limited command to said actuator via the acceleration limiter.

In an embodiment, the at least one control unit has a rate limiter to receive the range limited command from the range limiter, the rate limiter operable to output a rate limited command to said actuator to set a maximum value of the deployment speed.

In an embodiment, the rate limiter is operable to output the rate limited command to said actuator via the acceleration limiter.

In an embodiment, the at least one control unit has a position loop control in communication with at least one of the actuators to receive therefrom the actuator status information, and to output the actuator displacement command to said actuator to adjust a position of said actuator.

In an embodiment, at least one of the actuators is a hydraulic or an electric actuator.

DESCRIPTION OF THE DRAWINGS

Reference is now made to the accompanying figures in which:

FIG. 1 is a schematic tridimensional view of an aircraft;

FIG. 2 is a schematic view of a flight control surface and actuators of the aircraft shown in FIG. 1;

DETAILED DESCRIPTION

Figure 3:
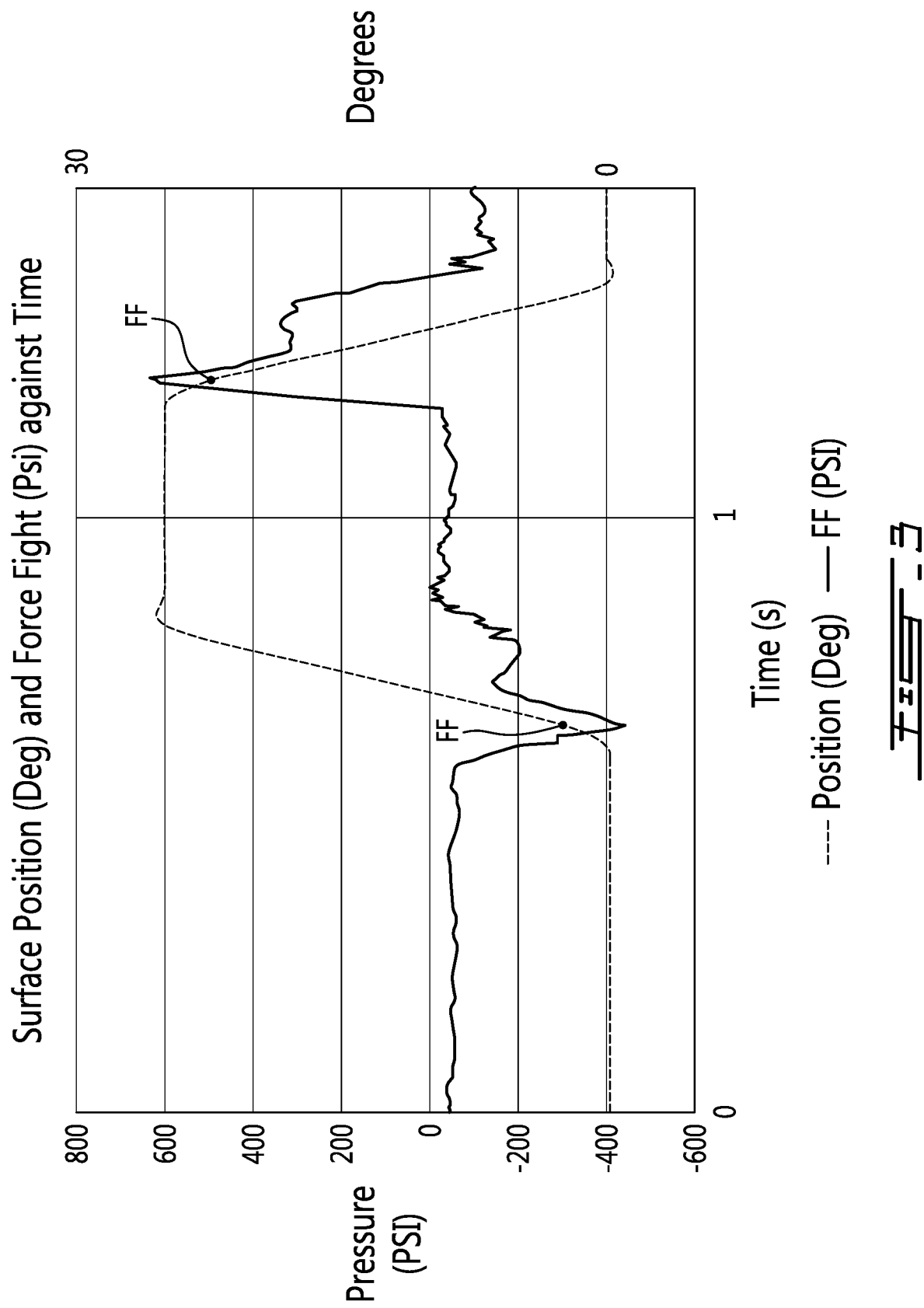
FIG. 3 is a plot showing force fight and surface position of a flight control surface as a function of time.

Referring to the drawings and more particularly to FIG. 1, an aircraft is shown at 1, and is generally described to illustrate some components for reference purposes in the present disclosure. The aircraft 1 has a fuselage 2 having a fore end and an aft end, with a cabin generally located between the cockpit and the tail assembly. A tail assembly comprises a vertical stabilizer 3 with a rudder, and horizontal stabilizers 4 with elevators. The tail assembly has a fuselage-mounted tail, but other configurations may also be used for the aircraft 1, such as cruciform, T-tail, etc. Wings 5 project laterally from the fuselage 2. The aircraft 1 has engines 6 supported by the fuselage 2 in the depicted embodiment, although for other aircraft they can be mounted to the wings 5. The aircraft 1 is shown as a jet-engine aircraft, but may also be a propeller aircraft. It is also understood that the aircraft 1 can be a business aircraft, alternately it can be any other type of aircraft, including, but not limited to, a commercial aircraft or a military aircraft, manned or unmanned.

During flight, the aircraft 1 is free to rotate about three perpendicular axes of motion. More particularly, during flight the aircraft 1 is free to pitch about a transverse or lateral axis which extends between the tips of the wings 5, to roll or bank about a longitudinal axis extending from the nose to the tail assembly, and to yaw about a vertical axis extending from a top of the aircraft 1 to its bottom. These axes move with the aircraft 1 and define one of its frames of reference.

The aircraft 1 has multiple flight control surfaces 8 (e.g. flaps, spoilers, ailerons, etc.), of which the ailerons 9 are only discussed herein for the purposes of simplicity. The flight control surfaces 8 help the aircraft 1 to rotate about the three perpendicular axes of motion. Each of the ailerons 9 is shaped as an airfoil, and the airfoil may be symmetric or asymmetric. Each of the ailerons 9 has a chord extending between a leading edge and a trailing edge. The ailerons 9 are disposed at, or aft of, the trailing edge of the wing 5 and are positioned on outboard (i.e. closer to the tip of the wing 5) sections of the wing 5. The ailerons 9 are deployed to roll or bank the aircraft 1 about its longitudinal axis.

FIG. 2 shows one of the ailerons 9 in isolation, as well as actuators 10 used to displace the aileron 9 to deploy and to retract the aileron 9. Each actuator 10 is housed within a dry section of the wing 5, and mounted to a suitable supporting structure in the wing 5 so that movement of the actuator 10, or some component thereof, causes a corresponding movement of the aileron 9. The two actuators 10 in the depicted embodiment are engaged with the same aileron 9. The aileron 9 is therefore a common flight control surface 8 for both the actuators 10. In the embodiment shown in FIG. 2, each actuator 10 is a hydraulic cylinder or motor, and has a cylinder housing 10A, a piston 10B disposed within the cylinder housing 10A and moveable therein in response to pressure differences across the piston 10B caused by hydraulic fluid within the cylinder housing 10A, and a piston rod 10C mounted to the piston 10B and to the aileron 9 and displaceable with the piston 10B. In an alternate embodiment, one or more of the actuators 10 is an electric motor or is powered by an electric motor.

Irrespective of the type of actuator 10 being used, each actuator 10 or one of its components is displaceable to displace aileron 9. In the embodiment shown in FIG. 2, for example, a distal end of the piston rod 10C of each actuator 10 is mounted to the aileron 9, such that extension of the piston rod 10C and displacement of its distal end away from the cylinder housing 10A causes the aileron 9 to deploy. Similarly, retraction of the piston rod 100 and displacement of its distal end toward the cylinder housing 10A causes the aileron 9 to retract. It will be appreciated that each actuator 10 will function slightly differently in the embodiment where it is an electric motor. The movement of one of the actuators 10 is controlled independently of the movement of the other actuator 10 in the depicted embodiment. Despite their independence, the movement of the actuators 10 is coordinated to effect a coordinated displacement of the aileron 9, such that the portions of the actuators 10 attached to the aileron 9 are synchronized in movement throughout extension or retraction of the piston rod 10C. More than two actuators 10 may be used to displace the same flight control surface 8, and the present disclosure is therefore not limited to using only two actuators 10 with a common flight control surface 8.

Still referring to FIG. 2, the actuators 10 are displaced over two periods: a first period of displacement referred to herein as the "initial period", followed by a second period of displacement referred to herein as the "deployment period". The initial period of displacement is a period of time during which each actuator 10 begins moving from a stationary position. In such a stationary position, the actuators 10 are motionless because they typically have not yet received the command to begin displacing. The speed of the actuators 10 in the stationary position is zero. Once the actuators 10 receive the command to begin displacing, the actuators 10 increase in speed until they obtain a deployment speed. The deployment speed is the speed of displacement of the actuators 10 to complete the deployment of the aileron 9. In some embodiments, the deployment speed is a constant speed of displacement of the actuators 10. In some embodiments, the deployment speed is a maximum speed of displacement of the actuators 10. The speed of the actuators 10 is measured in units of length per unit of time. It will therefore be appreciated that, during the initial period of displacement of the actuators 10, each actuator 10 will accelerate in speed from a substantially zero value to the deployment speed.

The deployment period is the period of time which follows the initial period. During the deployment period, the actuators 10 may be displacing at the deployment speed until they reach a deployed position (e.g. the piston rod 10C has extended to the desired position) to complete the deployment of the aileron 9. Once the actuators 10 reach the deployed position, the actuators 10 will stop displacing and their speed of displacement will return to zero.

While the movement of the actuators 10 is coordinated, it is not perfectly synchronized because one of the actuators 10 is typically in advance of the other. These relatively minor differences in the motion of the actuators 10 contributes to the phenomenon known as "force fight", which is experienced by the flight control surface 8 and/or the structure supporting the actuators 10, and may cause fatigue. Referring to FIG. 3, it has been observed that force fight appears to peak during the initial period of displacement of the actuators 10, when they are being displaced from one position to another. FIG. 3 shows the surface position of the aileron 9 in units of degrees, and shows force fight values in units of psi being superimposed over the surface position values, both values being shown as a function of time. As can be seen, there appears to be a relationship between the initial period of displacement of the aileron 9 and peaks in force fight. Indeed, the highest peaks for force fight in FIG. 3 appear to be correlated to the moment at which displacement of the aileron 9 occurs, which occur during the initial period of displacement of the actuators 10. During this initial period of displacement, acceleration of the actuators 10 displacing the aileron 9 is highest.

Figure 4:
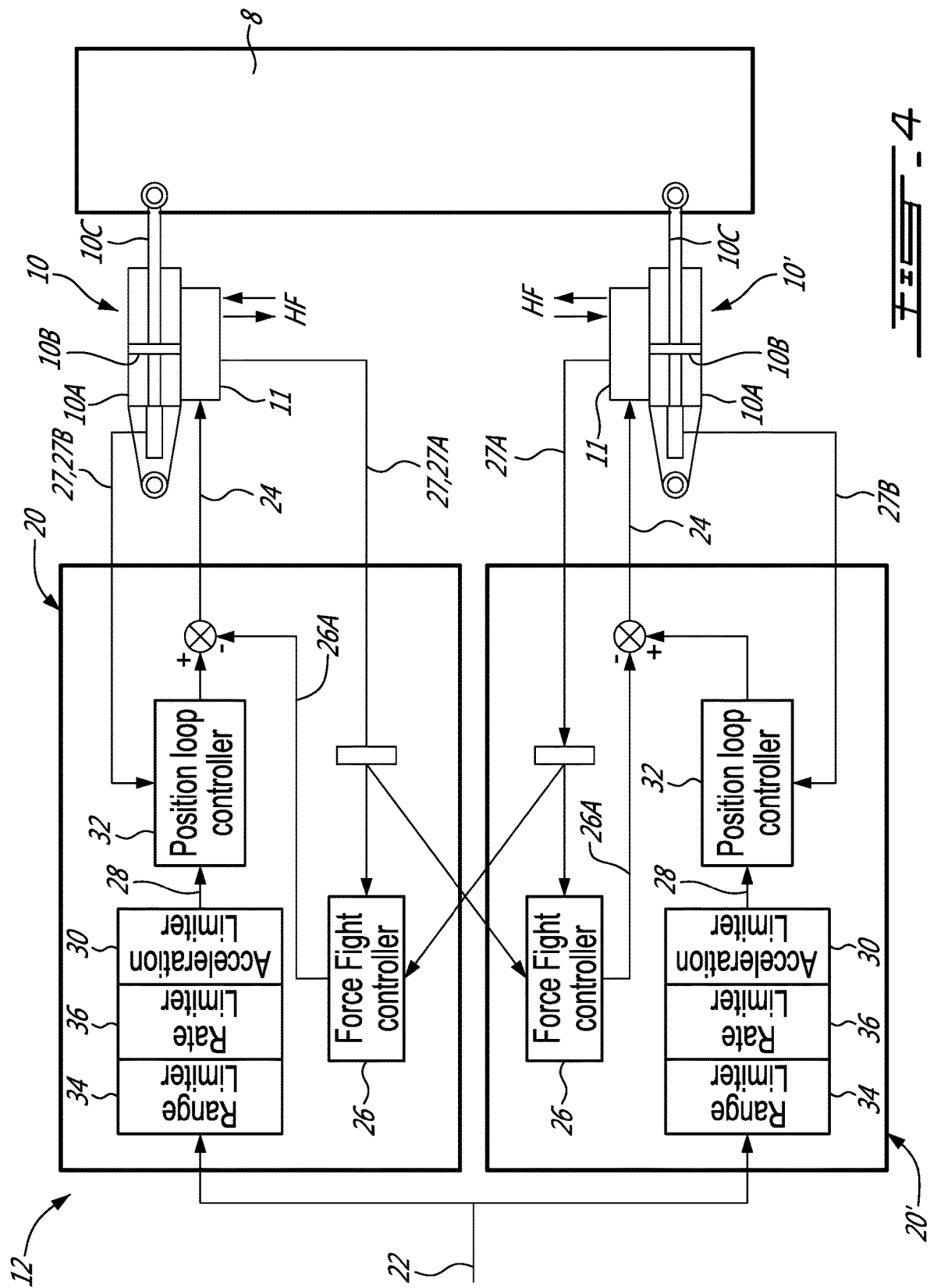
FIG. 4 is a schematic view of a system for deploying the flight control surface of FIG. 2.

Referring to FIG. 4, there is disclosed a system 12 for deploying, or controlling deployment of, the flight control surface 8. As will be described in greater detail below, the system 12 may help to reduce or eliminate the peak force fight observed during the initial period of displacement of the actuators 10. The system 12 shown in FIG. 4 has actuators 10 engaged with the common flight control surface 8, and also has a control unit 20. The system 12 may be a "fly-by-wire" system using only active and individually-controlled actuators 10.

The control unit 20 functions to control the deployment of the actuators 10. In operation, the control unit 20 receives a control surface position command 22 from an automated flight control system or at the direction of a pilot of the aircraft 1. The control surface position command 22 is the desired final position of the flight control surface 8, and the control surface position command 22 is processed by components of the control unit 20 to provide information to direct displacement of the actuators 10 and effect deployment of the actuators 10. The control surface position command 22 therefore contains information about the deployment of the flight control surface 8. This information may include, for example, the desired deployed position of the flight control surface 8 and a time for achieving the deployed position of the flight control surface 8. The information related to the deployed position of the flight control surface 8 may be provided in any unit of measurement, for example degrees of rotation of the flight control surface 8, or the position of the piston rod 10C or piston 10B which has been previously correlated with a position of the flight control surface 8. The control surface position command 22 is processed by the components of the control unit 20 and then outputted by the control unit 20 to the actuators 10 as an actuator displacement command 24. The actuator displacement command 24 includes information to direct the displacement of the actuators 10. Some examples of the information provided in the actuator displacement command 24 includes the degree value of deployment of the flight control surface 8, or the position value of the piston rod 10C or piston 10B. The control unit 20 may be any suitable component to achieve the above-described functionality. The control unit 20 may be any device that can collect, process, and transmit data. Some non-limiting examples of the control unit 20 include a microcontroller, a central processing unit (CPU), a front-end processor, a microprocessor, a graphics processing unit (GPU/VPU), a physics processing unit (PPU), a digital signal processor, and a network processor.

In the embodiment shown in FIG. 4, the system 12 has first and second control units 20,20'. The first control unit 20 functions to control the deployment of a first one of the actuators 10, and the second control unit 20' functions to control the deployment of the second actuator 10'. As will be explained in greater detail below, each of the first and second control units 20,20' may be in communication with both actuators 10,10' to receive actuator status information therefrom. For the sake of simplicity, only the components and functions of the first control unit 20 will be described in detail below and will be referred to as "the control unit 20", it being understood that this description of the components and functions applies mutatis mutandis to the second control unit 20'. In an alternate embodiment, the system 12 has only one control unit 20 in communication with all of the actuators 10 to control their displacement.

The control unit 20 has components which help to reduce or eliminate the force fight experienced by the flight control surface 8. The control unit 20 has a force fight controller 26. The force fight controller 26 detects when force fight occurs, and reduces the force fight to acceptable levels by controlling the positioning of the actuator 10. The force fight controller 26 is in communication with each of the first and second actuators 10,10' to receive actuator status information 27 from them. The actuator status information 27 is any data provided by the first and second actuators 10,10' which is indicative of their status, or a position of the first and second actuators 10,10'. For example, in the depicted embodiment, the actuator status information 27 output by the first and second actuators 10,10' to the force fight controller 26 includes pressure delta information 27A which is information on the pressure difference or delta across the piston 10B of each of the first and second actuators 10,10'. In the depicted embodiment, the first and second actuators 10,10' also output another type of actuator status information 27, namely positional information 27B which includes information on the position in units of length of the piston 10B within the cylinder housing 10A. The positional information is output to another component of the control unit 20, as described in greater detail below.

An example of how the force fight controller 26 functions is now provided with reference to FIG. 4. In the depicted embodiment, the first and second actuators 10,10' are hydraulic cylinders or motors. The force fight controller 26 receives from each of the first and second actuators 10,10' the pressure delta information 27A, which in the depicted embodiment is the pressure differential across the piston 10B of each actuator 10,10'. The first and second control units 20,20' may each have a router which routes the pressure delta information 27A to both of the force fight controllers 26. The force fight controller 26 compares the pressure differential in each of the first and second actuators 10,10' to determine whether the first and second actuators 10,10' are equally sharing the load associated with deploying the flight control surface 8. In the event that the force fight controller 26 determines that the first actuator 10 is assuming a smaller share of the load than the second actuator 10', the force fight controller 26 outputs corrective information 26A to complement or modify the actuator displacement command 24. The corrective information 26A may include, for example, increments or decrements in the positional value of the received position command 22. The actuator displacement command 24 is sent to an electro-hydraulic servo valve 11 of the first actuator 10. The actuator displacement command 24, as modified by the corrective information 26A received from the force fight controller 26, instructs the servo valve 11 to open and thereby increase the flow of hydraulic fluid HF into the cylinder housing 10A of the first actuator 10. Similarly, in the event that the force fight controller 26 determines that the first actuator 10 is assuming a larger share of the load than the second actuator 10', the force fight controller 26 outputs the corrective information 26A to modify the actuator displacement command 24, which instructs the servo valve 11 to close and thus decrease the flow of hydraulic fluid HF into the cylinder housing 10A of the first actuator 10. In general, increasing the flow of hydraulic fluid HF into the cylinder housing 10A will result in the piston 10B displacing faster. The force fight controller 26 of the second control unit 20' operates in a similar fashion with the second actuator 10'. The force fight controllers 26 for both the first and second control units 20,20' repeat the steps of receiving the pressure delta information 27A from both of the first and second actuators 10,10', comparing the pressure differential in the first and second actuators 10,10', and outputting the corrective information 26A to modify the actuator displacement command 24 to increase or decrease the opening in the servo valve 11 until the difference in pressure differential between the first and second actuators 10,10' is less than a given threshold. By helping the movement of the first and second actuators 10,10' to become more coordinated, the force fight controllers 26 help to reduce force fight acting on the flight control surface 8 to acceptable levels, or eliminate it entirely.

It will be appreciated that each force fight controller 26 may operate differently than described above, and is not limited to being used with hydraulic cylinders or to comparing hydraulic pressure differentials. For example, in the embodiment where each of the first and second actuators 10,10' is powered by an electric motor, each force fight controller 26 repeats the steps of receiving the actuator status information 27 from both of the first and second actuators 10,10', comparing the first and second actuators 10,10', and outputting the corrective information 26A to modify the actuator displacement command 24 to the first and second actuators 10,10' until the difference between the first and second actuators 10,10' is less than a given threshold.

It has been observed that the force fight controllers 26 are effective at addressing force fight in the medium and long-term of displacement of the first and second actuators 10,10', but are less effective during the initial period of displacement of the first and second actuators 10,10'. Although the force fight controllers 26 may operate continuously, there is a lag in their response, and before they can respond (i.e. during the initial period of displacement and at an end of a movement), the force fight load can reach high levels. As described above, it has been observed that there is a peak in force fight during the initial period when the force fight controllers 26 are less effective in addressing force fight. The force fight controllers 26 are, however, effective during the deployment period following the initial period of displacement of the first and second actuators 10,10'.

To address force fight during the initial period, the control unit 20 includes an acceleration limiter 30. Still referring to FIG. 4, the acceleration limiter 30 functions to limit the acceleration of the corresponding actuator 10 during the initial period, when it is displaced from a stationary position having zero speed to the deployment speed. The acceleration limiter 30 is in communication with one or both of the first and second actuators 10,10'. In the depicted embodiment, the acceleration limiter 30 functions to limit the acceleration of the corresponding actuator 10 only during the initial period, even though the acceleration limiter 30 may be continuously operating. The acceleration limiter 30 receives the control surface position command 22. The acceleration limiter 30 processes the information contained in the control surface position command 22, and outputs to the actuator 10 an acceleration limiter command 28 to limit or reduce an acceleration of the actuator 10 from the zero speed to the deployment speed.

The acceleration limiter command 28 contains any information needed to accomplish this functionality. In the depicted embodiment, the acceleration limiter command 28 modifies the positional information contained in the position command 22. For example, the position command 22 may contain information to command the flight control surface 8 to go to a 20° position almost immediately. The acceleration limiter 30 processes this information in the position command 22, and outputs the acceleration limiter command 28 which increases the time it takes for the flight control surface 8 to reach the 20° position. More particularly, the acceleration limiter command 28 will include commands for the flight control surface 8 to go to a 2° position in a first short time interval, then go to a 4° position in a second short time interval, then go to a 8° position in a third short time interval, etc. until the 20° position is achieved. Thus, in the depicted embodiment, the acceleration limiter command 28 has the same units as the position command 22. In an alternate embodiment, the acceleration limiter command 28 includes a pre-established maximum acceleration value, in units of length per unit of time squared, for the actuator 10. In another alternate embodiment, the acceleration limiter command 28 includes a maximum time value for the actuator 10 to accelerate from zero speed to the deployment speed. The acceleration limiter 30 is operable to output the acceleration limiter command 28 to increase the time for achieving the deployed position of the flight control surface 8.

The acceleration limiter 30 may take any form suitable to achieve such functionality. In the depicted embodiment, the acceleration limiter 30 is a "digital" limiter, and is embodied as a programme or an application stored in the memory of the control unit 20. In this embodiment, the acceleration limiter 30 is run on the processor of the control unit 20. In one possible embodiment, the acceleration limiter 30 is a linear second order filter or low pass filter which helps to smooth out the motion of the actuator 10 and indirectly limit its accelerations. In another possible embodiment, the acceleration limiter 30 is a non-linear second order filter which is modified to incorporate an acceleration saturation. It limits acceleration while allowing exceeding temporarily the speed limit to compensate/reduce the lag cumulated at the start of the motion.

The acceleration limiter 30 therefore functions to reduce the acceleration of the actuator 10 in the initial period such that it takes it longer to reach the deployment speed, thereby providing more time for the force fight controller 26 to address force fight upon receiving the actuator status information 27 from the actuators 10. In so doing, the acceleration limiter 30 helps to lower peak force fight in the initial period of acceleration of the actuators 10, and slow the rate of increase of force fight. The acceleration limiter 30 acts when the force fight controller 26 is not effective because it has not yet received actuator status information 27 from the actuators 10. When used in conjunction with the force fight controller 26, the acceleration limiter 30 may help to attenuate force fight over the entire range of displacement of the actuators 10, and is thus complementary to the force fight controller 26.

Still referring to FIG. 4, each of the first and second control units 20,20' have an acceleration limiter 30. Each of the acceleration limiters 30 is in communication with one of the first and second actuators 10,10' to communicate the acceleration limiter command 28 thereto. In the depicted embodiment, the acceleration limiter command 28 sent by one of the acceleration limiters 30 may be different from the acceleration limiter command 28 communicated by the other acceleration limiter 30. Since each of the first and second actuators 10,10' are displaced independently of one another, it may be necessary to limit or reduce their acceleration during the initial period in a similarly independent fashion. In an alternate embodiment, a single acceleration limiter 30 communicates with both the first and the second actuators 10,10' to communicate the acceleration limiter command 28.

In the embodiment shown in FIG. 4, the control unit 20 has a position loop control 32. The position loop control 32 outputs the actuator displacement command 24 as a function of the actuator status information 27 provided by one of the actuators 10, and as a function of the corrective information 26A received from the force fight controller 26. In the depicted embodiment, the position loop control 32 receives the positional information 27B from the actuator 10. After processing the positional information 27B received from the actuator 10, the position loop control 32 outputs the actuator displacement command 24 to the actuator 10 commanding its servo valve 11 to open or close. In the depicted embodiment, the actuator displacement command 24 may be modified by the acceleration limiter command 28. An example of how the position loop control 32 functions is now described. The position loop control 32 receives the positional information 27B feedback from the actuator 10. In the depicted embodiment, the positional information 27B includes the actual deployed position of the piston 10B of the actuator 10, measured in units of length. The position loop control 32 compares the positional information 27B to the desired position of the piston 10B communicated in the position command 22. If there is a difference between the actual deployed position of the piston 10B in the positional information 27B and the desired final position of the piston 10B communicated in the position command 22, the actuator displacement command 24 emitted by the position loop control 32 will include commands to open or close the opening of the servo valve 11 of the actuator 10 to adjust the position of the actuator 10 until the difference is substantially zero.

The position loop control 32 in the depicted embodiment is continuously operating, and continuously receives positional feedback from the actuator 10. The acceleration limiter 30 is implemented upstream of the position loop control 32 to avoid affecting the stability of the position loop. In the depicted embodiment, the position loop control 32 of each control unit 20,20' communicates with only one of the actuators 10,10'. In an alternate embodiment, a single position loop control 32 communicates with both the first and the second actuators 10,10' to communicate thereto the position feedback command 29. Although each control unit 20,20' is shown in FIG. 4 as having its own position loop control 32, in an alternate embodiment, one or more of the control units 20,20' may not have a position loop control 32.

In the embodiment shown in FIG. 4, the control unit 20 has additional components which process the position command 22 "upstream" of the acceleration limiter 30. In other words, the control surface position command 22 is modified by these other components before it is provided to the acceleration limiter 30.

One of these components shown in FIG. 4 is a range limiter 34. The range limiter 34 limits the maximum, and possibly also the minimum, value of the desired deployed position of the flight control surface 8 included in the control surface position command 22. The range limiter 34 in operation receives the control surface position command 22, which includes the desired deployed position of the flight control surface 8. The range limiter 34 outputs a range limited command to the actuator 10 to decrease the deployed position of the flight control surface 8 to a pre-established maximum value of the deployed position of the flight control surface 8. The range limiter 34 is operable to receive the control surface position command 22 before the acceleration limiter 30, and to output the range limited command to the acceleration limiter 30 before the range limited command is communicated to the actuator 10.

Another of the components which processes the control surface position command 22 before it reaches the acceleration limiter 30 is a rate limiter 36. The rate limiter 36 is a speed limiter, which establishes a maximum deployment speed for the actuator 10. In an embodiment, each actuator 10 accelerates from zero speed to the deployment speed set by the rate limiter 36 during the initial period, and the actuator 10 continues to displace at the deployment speed until deployment of the flight control surface 8 is completed. The rate limiter 36 functions to receive the range limited command from the range limiter 34. The rate limiter 36 outputs a rate limited command to the actuator 10 to set a maximum value of the deployment speed. In the depicted embodiment, the rate limiter 36 functions downstream of the range limiter 34 and upstream of the acceleration limiter 30. The rate limiter 36 is therefore operable to output the rate limited command to the acceleration limiter 30 before the rate limited command is communicated to the actuator 10. It is possible to move the position of the range limiter 34 and the rate limiter 36 relative to the acceleration limiter 30. For example, in an embodiment, the range limiter 34 is positioned downstream of the rate limiter 36.

The range limiter 34 and the rate limiter 36 may take any form suitable to achieve their ascribed functionality. In the depicted embodiment, the range limiter 34 and the rate limiter 36 are "digital" limiters, and are embodied as programmes or applications stored in the memory of the control unit 20. In this embodiment, the range limiter 34 and the rate limiter 36 are run on the processor of the control unit 20.

Figure 5:
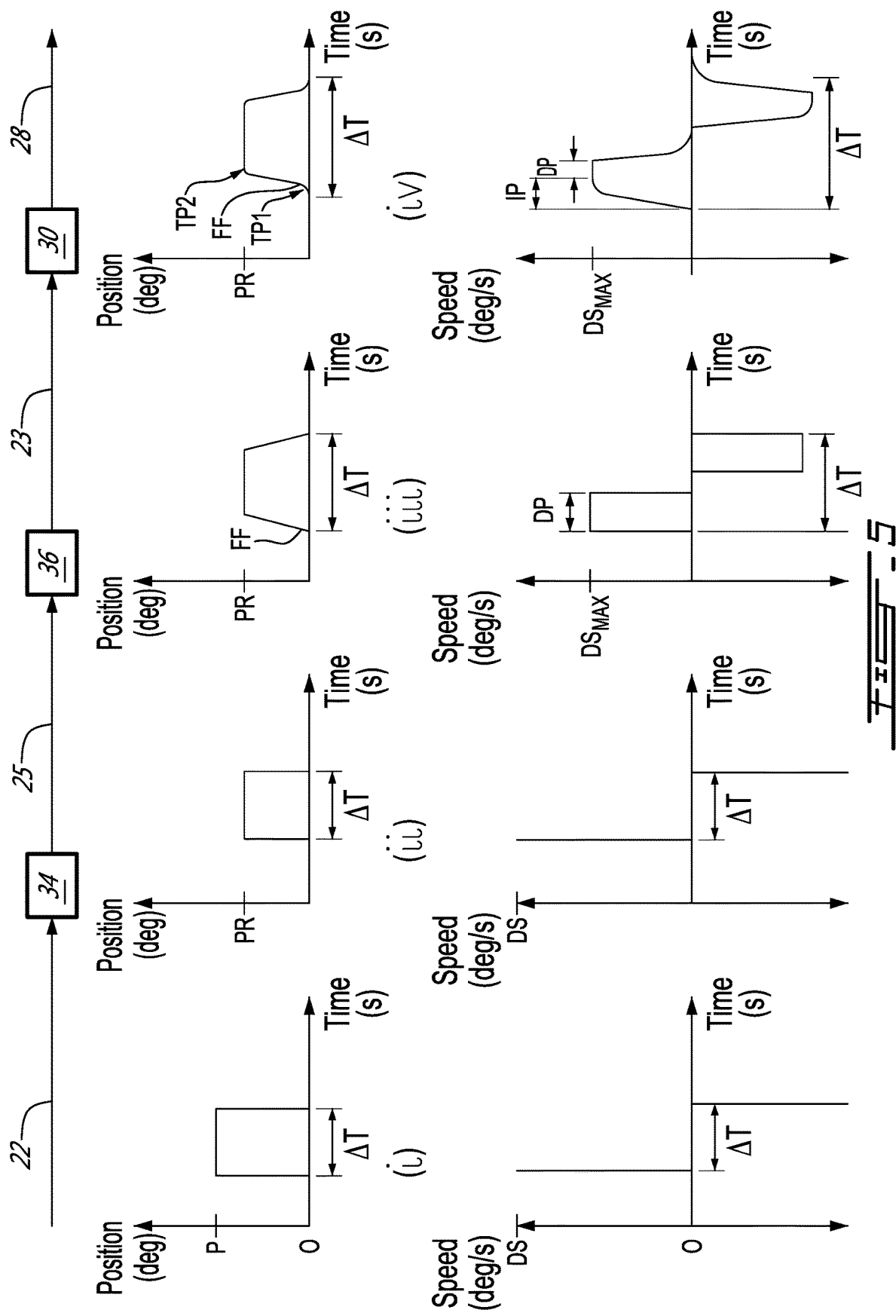
FIG. 5 shows plots of a position of the flight control surface of FIG. 2 as a function of time, and a speed of the actuators of FIG. 2 as a function of time.

An example of the effects of the range limiter 34, the rate limiter 36 and the acceleration limiter 30 on the control surface position command 22 is more clearly observed in FIG. 5, which shows plots of the position of the flight control surface 8 as a function time, and plots of the speed of the actuators 10 as a function of time.

Referring to plots (i) shown in FIG. 5, when initially provided by the automated flight control system or at the direction of the pilot, the control surface position command 22 contains information on the desired deployed position P of the flight control surface 8. For example, as shown in the position plot, the desired deployed position P may be 30 degrees. The control surface position command 22 in this example therefore contains instructions for the flight control surface 8 to move from a 0 degree position to the 30 degree deployed position P. The flight control surface 8 remains at the position P for a duration of time ΔT, at the end of which, the flight control surface 8 returns to its original position. In an alternate embodiment, the flight control surface 8 remains at the position P for a more prolonged period of time. The curve of the position plot is substantially similar to a step function. The speed plot shows that the speed of the actuator 10 will increase from zero speed to the deployment speed DS (which in the speed plot (i) is a very large speed) almost instantaneously, and then return to zero speed almost instantaneously once the flight control surface 8 has achieved the desired deployed position P. When the flight control surface 8 returns to the original position after the duration of time ΔT, the speed plot (i) shows that the speed of the actuator 10 will increase almost instantaneously in an opposite direction from zero speed to a retraction speed (which in the speed plot (i) is a very large speed), and then return to zero speed almost instantaneously once the flight control surface 8 has returned to the original position. The speed is shown in units of degrees per second. The initial period IP of displacement of the actuator 10 is the period of time over which the actuator 10 accelerates from zero speed to the deployment speed DS, and the deployment period DP is the period of time from the moment the actuator 10 achieves the deployment speed DS until it returns to zero speed. In the speed plot (i), the initial period IP and the deployment period DP are almost instantaneous, and thus have a value of approximately zero seconds.

The plots (ii) shown in FIG. 5 show the effect of the range limiter 34 on the control surface position command 22. The range limiter 34 receives the control surface position command 22, and outputs the range limited command 25 to decrease the value of the deployed position P. The range limited deployed position PR is a pre-established maximum value of the deployed position P, for example 25 degrees The speed plot (ii) is identical to the speed plot (i).

The plots (iii) shown in FIG. 5 show the effect of the rate limiter 36 on the control surface position command 22, as modified by the range limiter command 25. The rate limiter 36 functions to receive the range limited command 25 from the range limiter 34. The rate limiter 36 outputs the rate limited command 23 to set a maximum value of the deployment speed $DS_{MAX}$ of the actuator 10. The maximum value of the deployment speed $DS_{MAX}$ is a pre-established maximum value. In the speed plot shown in (iii), the maximum value of the deployment speed $DS_{MAX}$ is less than the deployment speed DS associated with the control surface position command 22. Since the actuators 10 are commanded at a slower deployment speed, the time needed to reach the range limited deployed position PR is greater than the time in the position plots shown in (i) and (ii), and similarly the time needed to return from the range limited deployed position PR to the original position is greater than in the position plots shown in (i) and (ii). The total duration of time ΔT is thus greater in plot (iii) than it is in plots shown in (i) and (ii). In the speed plot (iii), the initial period IP is almost instantaneous and has a value of approximately zero seconds, and the deployment period DP is longer than the initial period IP, and longer than the initial period IP shown in speed plot (ii).

The plots (iv) shown in FIG. 5 show the effect of the acceleration limiter 30 on the control surface position command 22, as modified by the rate limited command 23 and the range limited command 25. The acceleration limiter 30 processes the information contained in the rate limited command 23, and outputs to the position loop controller 32 or to the actuator 10 the acceleration limiter command 28 to limit or reduce the acceleration of the actuator 10. Limiting or reducing the acceleration of the actuator 10 increases the time it takes for the actuator 10 to reach the deployment speed $DS_{MAX}$. The total duration of time ΔT is greater in plot (iv) than it is in plots shown in (i), (ii) and (iii). In the speed plot shown in (iv), the initial period IP is longer when compared to the speed plot shown in (i), (ii) and (iii). In the speed plot shown in (iv), the deployment period DP is shorter when compared to the speed plot shown in (iii). Since the actuators 10 are accelerating at a lower rate, the time needed to reach the range limited deployed position PR is greater than the time in the other position plots.

The acceleration limiter 30 also has the effect of "smoothing", "stretching", or rounding parts of the curve in the position plot, particularly at moments of initial or final movements. As shown in the position plot (iv), the curve has first and second transition periods TP1,TP2. The first transition period TP1 occurs in the initial period IP, when the actuator 10 begins to accelerate from zero speed. Since the acceleration of the actuator 10 has been limited by the acceleration limiter 30, the actuator 10 more gradually begins to increase in speed, which results in the position of the flight control surface 8 being adjusted more gradually or smoothly. The second transition period TP2 occurs near the end of the deployment period DP, when the actuator 10 begins to decelerate toward zero speed. Since the acceleration of the actuator 10 has been limited by the acceleration limiter 30, the actuator 10 more gradually begins to decrease in speed, which results in the flight control surface 8 transitioning more gradually to the range limited deployed position PR.

In comparing the position plots (i) through (iv), it is observed that the substantially step function input provided by the control surface position command 22 is transformed more into a "ramp" function by the rate limiter 36 and into a "smooth" ramp function by the acceleration limiter 30 which is provided as an input to the position loop controller 32 or to the actuator 10. It is also possible to see in the position plots (i) through (iv) the point in time (i.e. during the deployment period DP) at which the force fight controller 26, which may operate continuously, begins to be effective, shown in the plots and also in FIG. 3 as FF.

Referring to FIG. 4, there is also disclosed a method for deploying the flight control surface 8. The method includes displacing the actuators 10,10' engaged with the flight control surface 8 during the initial period, and during the deployment period after the initial period. The method includes, during the deployment period, controlling displacement of at least one of the actuators 10,10' in response to the actuator status information 27 received therefrom. The method includes, at least during the initial period, limiting an acceleration of the actuator 10,10' from the zero speed to the deployment speed.

The system 12 and method disclosed herein may help to attenuate transient load peaking, due to force fight, affecting the actuators 10,10' and the flight control surface 8. Reducing transient loads may have beneficial design effects, because the flight control surface 8 and the actuators 10,10' may be designed for less peak loading, which may result in lower weight for these components and smaller components. Furthermore, the acceleration limiter 30 in the embodiment where it is digitally implemented imposes no weight penalty. Furthermore, in contrast to some conventional force fight systems, the system 12 and method disclosed herein are capable of being "proactive" rather than "reactive", because they may impact force fight prior to the force fight controller 26 being effective. In this sense, the acceleration limiter 30 is complementary to the force fight controller 26 in terms of force fight load reduction.

The above description is meant to be exemplary only, and one skilled in the art will recognize that changes may be made to the embodiments described without departing from the scope of the invention disclosed. For example, although the flight control surface 8 is described herein as being deployed or deployable, it will be appreciated that the system 12 and method disclosed herein are also applicable and effective when the flight control surface 8 is being retracted. Still other modifications which fall within the scope of the present invention will be apparent to those skilled in the art, in light of a review of this disclosure, and such modifications are intended to fall within the appended claims.

The invention claimed is:

1. A method for deploying a flight control surface, comprising:
   providing a value for a deployed position of the flight control surface;
   displacing actuators engaged with the flight control surface during an initial period wherein each actuator displaces from zero speed to a deployment speed, and during a deployment period after the initial period;
   during the deployment period, controlling displacement of at least one of the actuators in response to actuator status information received therefrom; and during the initial period, reducing the value for the deployed position of the flight control surface and then limiting an acceleration of said actuator from the zero speed to the deployment speed.

2. The method of claim 1, wherein limiting the acceleration includes limiting the acceleration of said actuator more than limiting the acceleration of at least another one of the actuators.

3. The method of claim 1, further comprising providing a target deployment speed for the actuators, and subsequently reducing the target deployment speed to the deployment speed.

4. The method of claim 3, wherein reducing the target deployment speed includes reducing the target deployment speed before limiting the acceleration of said actuator.

5. The method of claim 1, further comprising receiving the actuator status information from at least one of the actuators, and outputting an actuator displacement command to said actuator to adjust a position of said actuator.

6. A system for deploying a flight control surface, comprising:
actuators engaged with the flight control surface, each actuator being displaceable to displace the flight control surface during an initial period wherein each actuator displaces from zero speed to a deployment speed, and during a deployment period after the initial period; and
at least one control unit operable to receive a control surface position command including a deployed position of the flight control surface, and to output an actuator displacement command, the at least one control unit comprising:
a force fight controller in communication with each actuator to receive therefrom actuator status information, and in response thereto, to modify the actuator displacement command to control displacement of said actuator during the deployment period; and
an acceleration limiter in communication with at least one of the actuators and operable during displacement of the actuators in the initial period to receive the control surface position command, and to output an acceleration limiter command to said actuator to:
limit an acceleration of said actuator from the zero speed to the deployment speed, and
to increase a time for achieving the deployed position of the flight control surface.

7. The system of claim 6, wherein the acceleration limiter command to said actuator is different from the acceleration limiter command outputted to at least another one of the actuators.

8. The system of claim 6, wherein the at least one control unit has a range limiter in communication with at least one of the actuators, the range limiter operable to receive the control surface position command including the deployed position of the flight control surface, the range limiter operable to output a range limited command to said actuator to decrease the deployed position of the flight control surface to a maximum value of the deployed position of the flight control surface.

9. The system of claim 8, wherein the range limiter is operable to receive the control surface position command before the acceleration limiter, and to output the range limited command to said actuator via the acceleration limiter.

10. The system of claim 9, wherein the at least one control unit has a rate limiter to receive the range limited command from the range limiter, the rate limiter operable to output a rate limited command to said actuator to set a maximum value of the deployment speed.

11. The system of claim 10, wherein the rate limiter is operable to output the rate limited command to said actuator via the acceleration limiter.

12. The system of claim 6, wherein the at least one control unit has a position loop control in communication with at least one of the actuators to receive therefrom the actuator status information, and to output the actuator displacement command to said actuator to adjust a position of said actuator.

13. The system of claim 6, wherein at least one of the actuators is a hydraulic actuator or an electric actuator.

* * * * *